(12) United States Patent
Fu et al.

(10) Patent No.: US 9,872,021 B2
(45) Date of Patent: Jan. 16, 2018

(54) VIDEO CONVERSION METHOD AND APPARATUS

(71) Applicant: Huawei Technologies Co., Ltd., Shenzhen (CN)

(72) Inventors: Jiali Fu, Shenzhen (CN); Qingpeng Xie, Shenzhen (CN)

(73) Assignee: Huawei Technologies Co., Ltd., Shenzhen, Guangdong (CN)

( * ) Notice: Subject to any disclaimer, the term of this patent is extended or adjusted under 35 U.S.C. 154(b) by 630 days.

(21) Appl. No.: 14/335,119

(22) Filed: Jul. 18, 2014

(65) Prior Publication Data
US 2014/0348246 A1 Nov. 27, 2014

Related U.S. Application Data

(63) Continuation of application No. PCT/CN2012/077799, filed on Jun. 28, 2012.

(30) Foreign Application Priority Data

Jan. 19, 2012 (CN) .......................... 2012 1 0017751

(51) Int. Cl.
*H04N 7/12* (2006.01)
*H04N 11/02* (2006.01)
(Continued)

(52) U.S. Cl.
CPC ......... *H04N 19/115* (2014.11); *H04N 19/154* (2014.11); *H04N 19/172* (2014.11);
(Continued)

(58) Field of Classification Search
CPC ....... H04N 19/00472; H04N 19/00909; H04N 21/2343; H04N 21/4402; H04N 21/23418;
(Continued)

(56) References Cited

U.S. PATENT DOCUMENTS 6,532,593 B1 3/2003 Moroney
8,897,370 B1 * 11/2014 Wang ................... H04N 19/139
375/240.2

(Continued)

FOREIGN PATENT DOCUMENTS

CN 1943240 A 4/2007
CN 101068355 A 11/2007
(Continued)

OTHER PUBLICATIONS

Huang, et al., "A Compressed Domain Distortion Measure for Fast Video Transcoding," Sep. 28, 2007, 4 pages.

*Primary Examiner* — Sath V Perungavoor
*Assistant Examiner* — Xiaolan Xu
(74) *Attorney, Agent, or Firm* — Fish & Richardson P.C.

(57) ABSTRACT

The present invention discloses a video conversion method and apparatus, relates to digital media technologies. A video source is received and compression distortion quality of the video source is acquired. A transcoding policy corresponding to the compression distortion quality of the video source is acquired according to the compression distortion quality of the video source. It is determining, according to the transcoding policy, whether the video source requires transcoding. Transcoding parameters are generated according to the transcoding policy if the video source requires transcoding. The transcoding policy includes target video quality and the transcoding parameters include a target resolution, a target frame rate, and a target bit rate. The video source is converted according to the target resolution, the target frame rate, and the target bit rate, and generating a transcoded video.

22 Claims, 8 Drawing Sheets

(51) Int. Cl.
  *H04N 11/04*      (2006.01)
  *H04N 19/115*     (2014.01)
  *H04N 21/2343*    (2011.01)
  *H04N 21/4402*    (2011.01)
  *H04N 21/234*     (2011.01)
  *H04N 21/44*      (2011.01)
  *H04N 19/154*     (2014.01)
  *H04N 19/40*      (2014.01)
  *H04N 19/172*     (2014.01)

(52) U.S. Cl.
  CPC ......... *H04N 19/40* (2014.11); *H04N 21/2343* (2013.01); *H04N 21/23418* (2013.01); *H04N 21/4402* (2013.01); *H04N 21/44008* (2013.01)

(58) Field of Classification Search
  CPC ........... H04N 21/44008; H04N 19/115; H04N 19/154; H04N 19/40; H04N 19/172
  See application file for complete search history.

(56) References Cited

U.S. PATENT DOCUMENTS

| | | |
|---|---|---|
| 2002/0169823 A1 | 11/2002 | Coulombe et al. |
| 2003/0185453 A1 | 10/2003 | Joshi et al. |
| 2005/0008074 A1 | 1/2005 | Van Beek et al. |
| 2005/0031219 A1* | 2/2005 | Puri .................. H04N 19/46 382/250 |
| 2005/0182855 A1 | 8/2005 | Apostolopoulos et al. |
| 2005/0232497 A1 | 10/2005 | Yogeshwar et al. |
| 2006/0013300 A1* | 1/2006 | Han .................. H04N 19/70 375/240.03 |
| 2007/0053427 A1 | 3/2007 | Henocq |
| 2008/0123741 A1 | 5/2008 | Li et al. |
| 2010/0074333 A1 | 3/2010 | Au et al. |
| 2013/0156310 A1* | 6/2013 | Yao .................. H04N 19/154 382/166 |

FOREIGN PATENT DOCUMENTS

| | | |
|---|---|---|
| CN | 101188756 A | 5/2008 |
| CN | 101677405 A | 3/2010 |
| CN | 101842812 A | 9/2010 |
| CN | 101888547 A | 11/2010 |
| CN | 101998117 A | 3/2011 |
| EP | 1587327 A2 | 10/2005 |
| EP | 2210237 A1 | 7/2010 |
| WO | 2006126974 A1 | 11/2006 |

\* cited by examiner

VIDEO CONVERSION METHOD AND APPARATUS

This application is a continuation of International Application No. PCT/CN2012/077799, filed on Jun. 28, 2012, which claims priority to Chinese Patent Application No. 201210017751.5, filed on Jan. 19, 2012, both of which are hereby incorporated by reference in their entireties.

TECHNICAL FIELD

The present invention relates to the field of digital media technologies, and in particular, to a video conversion method and apparatus.

BACKGROUND

The video conversion technology is widely applied in scenarios such as video broadcast transcoding, video surveillance, digital media adapters, and high-definition video conferences. Video conversion refers to converting a compressed and coded video code stream into another video code stream, so as to adapt to a different network bandwidth, a different terminal processing capability, a different user requirement, and the like.

In one of current video conversion methods, different resolutions are preset for different bit rates. For example, a resolution of 320*240 is corresponding to a bit rate of 100000 bit/s. For another example, a resolution of 640*480 is corresponding to a bit rate of 120000 bit/s, and so on. In video conversion, a bit rate corresponding to a resolution can be learnt according to a resolution that is to be obtained after the conversion. When a video is output, the bit rate corresponding to the resolution may be used as an output bit rate. In addition, there is also another video conversion method, which classifies output bit rates into several levels according to an actual requirement. For example, at a first level, an output bit rate is 90% of an input bit rate; at a second level, an output bit rate is 80% of an input bit rate, and so on. Then in video conversion, an output bit rate is selected by selecting a different level according to an actual requirement, for example, in a situation in which transmission bandwidths are different.

In an implementation process of embodiments of the present invention, the inventor finds that the prior art has at least the following problem. According to a video conversion method in the prior art, video conversion is performed by using a fixed relationship between a resolution and a bit rate or a fixed relationship between a transmission bandwidth and a bit rate, which cannot ensure target video quality after the video conversion, thereby affecting user experience.

SUMMARY

Embodiments of the present invention provide a video conversion method and apparatus, which can solve a problem in the prior art that after video conversion, target video quality is low, and user experience is poor.

To achieve the foregoing purpose, the embodiments of the present invention adopt the following technical solutions:

In a video conversion method a video source is received and compression distortion quality of the video source is acquired. A transcoding policy corresponding to the compression distortion quality of the video source is acquired according to the compression distortion quality of the video source. It is determining, according to the transcoding policy, whether the video source requires transcoding. Transcoding parameters are generated according to the transcoding policy if the video source requires transcoding. The transcoding policy includes target video quality and the transcoding parameters include a target resolution, a target frame rate, and a target bit rate. The video source is converted according to the target resolution, the target frame rate, and the target bit rate, and generating a transcoded video.

A video conversion apparatus includes a number of units. A video source receiving unit is configured to receive a video source and to acquire compression distortion quality of the video source. A transcoding policy acquiring unit is configured to acquire, according to the compression distortion quality of the video source, a transcoding policy corresponding to the compression distortion quality of the video source and to determine, according to the transcoding policy, whether the video source requires transcoding. A generating unit is configured to generate transcoding parameters according to the transcoding policy if the video source requires transcoding, where the transcoding policy includes target video quality, and the transcoding parameters include a target resolution, a target frame rate, and a target bit rate. A transcoding unit is configured to convert the video source according to the target resolution, the target frame rate, and the target bit rate, and generate a transcoded video.

According to the video conversion method and apparatus provided in the embodiments of the present invention, a video source is received, and compression distortion quality of the video source is obtained. Further, a corresponding transcoding policy is acquired, and whether the video source requires transcoding is determined according to the transcoding policy. If the video source requires transcoding, transcoding parameters are generated according to the transcoding policy, and the video source is converted according to the transcoding parameters, so that target video quality is relatively high after the video source is converted, thereby improving user experience. Compared with the prior art, the video conversion method and apparatus provided in the embodiments of the present invention can solve a problem in the prior art that after video conversion, target video quality is low, and user experience is poor.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

To make advantages of the technical solutions of the present invention clearer, the following describes the present invention in detail with reference to the accompanying drawings and the embodiments.

It should be noted that an executor of a video conversion method provided in the embodiments of the present invention is a video conversion apparatus, and the video conversion apparatus can be applied to a network device (for example, a network server) or a terminal device (for example, a mobile phone terminal, a tablet computer, and a notebook computer).

Figure 1:
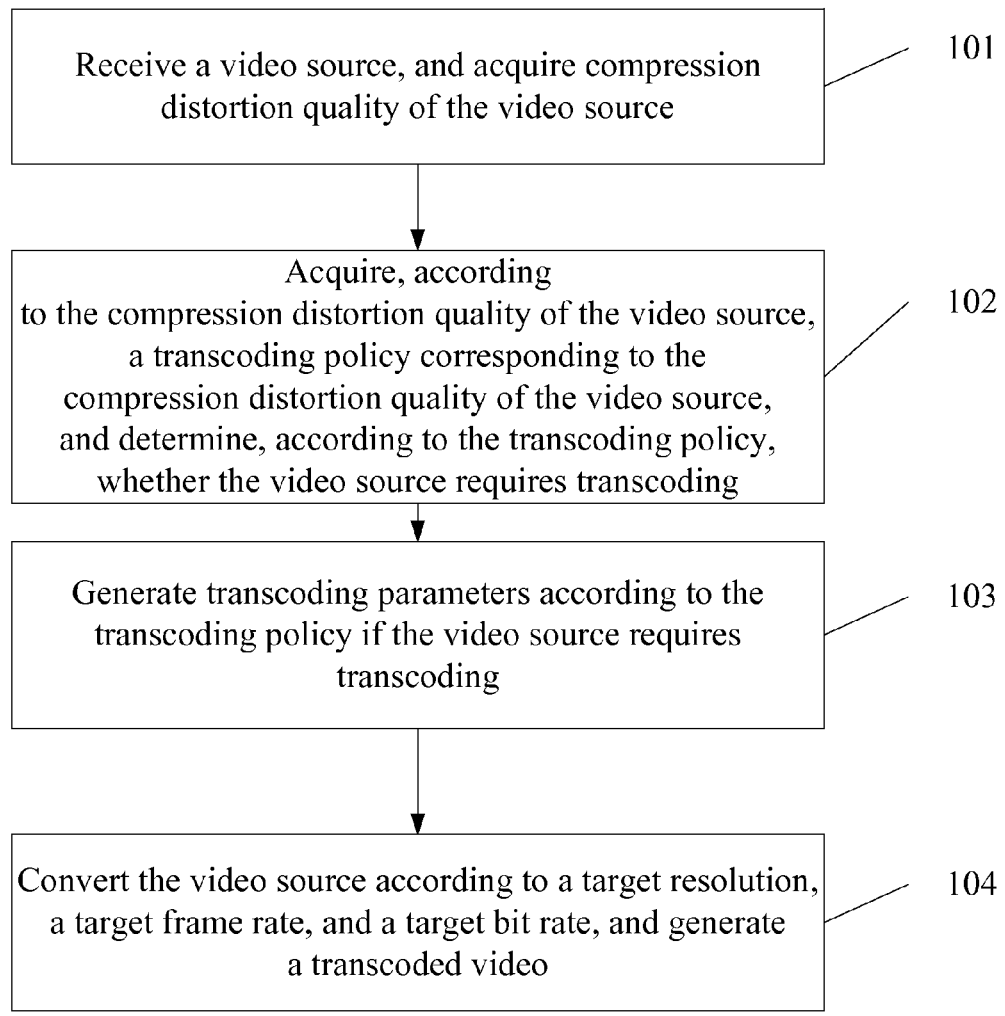
FIG. 1 is a flowchart of a video conversion method according to an embodiment of the present invention.

As shown in FIG. 1, an embodiment of the present invention provides a video conversion method, and the method includes the following steps.

Step 101: Receive a video source, and acquire compression distortion quality of the video source.

Compression distortion is distortion caused by video coding and compression. The compression distortion quality is basic video quality that takes only compression into account after different video sources are coded to different bit rates.

Specifically, before the receiving a video source, and acquiring compression distortion quality of the video source, the method further includes sending correspondence between the compression distortion quality and a transcoding policy. A specific implementation manner may be but is not limited to acquiring terminal information of multiple terminals, for example, acquiring information such as resolutions of various mobile phones, tablet computers, and notebook computers, and the like. The method also includes setting the correspondence between the compression distortion quality and the transcoding policy according to terminal information of each terminal, for example, setting a transcoding policy as policy 1 according to terminal information of mobile phone 1 in a situation in which compression distortion quality is 3 points, and setting a transcoding policy as policy 2 according to terminal information of tablet computer 1 in a situation in which compression distortion quality is 3 points. Because the terminal information of the mobile phone 1 and the tablet computer 1 are different, in a situation in which the compression distortion quality of both the mobile phone 1 and the tablet computer 1 are 3 points, the policy 1 and the policy 2 may be different, but are not limited thereto.

Step 102: Acquire, according to the compression distortion quality of the video source, a transcoding policy corresponding to the compression distortion quality of the video source, and determine, according to the transcoding policy, whether the video source requires transcoding.

Step 103: Generate transcoding parameters according to the transcoding policy if the video source requires transcoding.

The transcoding policy includes target video quality, and the transcoding parameters include a target resolution, a target frame rate, and a target bit rate.

If the video source does not require transcoding, a code stream of the video source is directly output when the video source is required.

Step 104: Convert the video source according to the target resolution, the target frame rate, and the target bit rate, and generate a transcoded video.

A transcoding type that may be adopted in the conversion of the video source is real-time transcoding, offline transcoding, or multi-stream coding, but is not limited thereto.

Further, if the compression distortion quality of the video source is corresponding to one or more levels of transcoding policies, the video source is converted into one or more transcoded videos corresponding to the one or more levels of transcoding policies, and information of a terminal is acquired, where the information of the terminal includes a resolution and a frame rate of the terminal.

A transcoded video corresponding to the resolution of the terminal is acquired according to the resolution and the frame rate of the terminal. For example, if a resolution of a mobile phone is 320*240, and a frame rate is 60 fps, when a transcoded video is acquired, a transcoded video with a resolution approximate or equal to 320*240 and with a frame rate approximate or equal to 60 fps is acquired.

According to the video conversion method provided in the embodiment of the present invention, a video source is received, and compression distortion quality of the video source is obtained. Further, a corresponding transcoding policy is acquired, and whether the video source requires transcoding is determined according to the transcoding policy. If the video source requires transcoding, transcoding parameters are generated according to the transcoding policy, and the video source is converted according to the transcoding parameters, so that target video quality is relatively high after the video source is converted, thereby improving user experience. Compared with the prior art, the video conversion method and apparatus provided in the embodiments of the present invention can solve a problem in the prior art that after video conversion, target video quality is low, and user experience is poor.

To make the embodiments of the present invention clearer, the following describes the embodiments of the present invention more specifically.

Figure 2A:
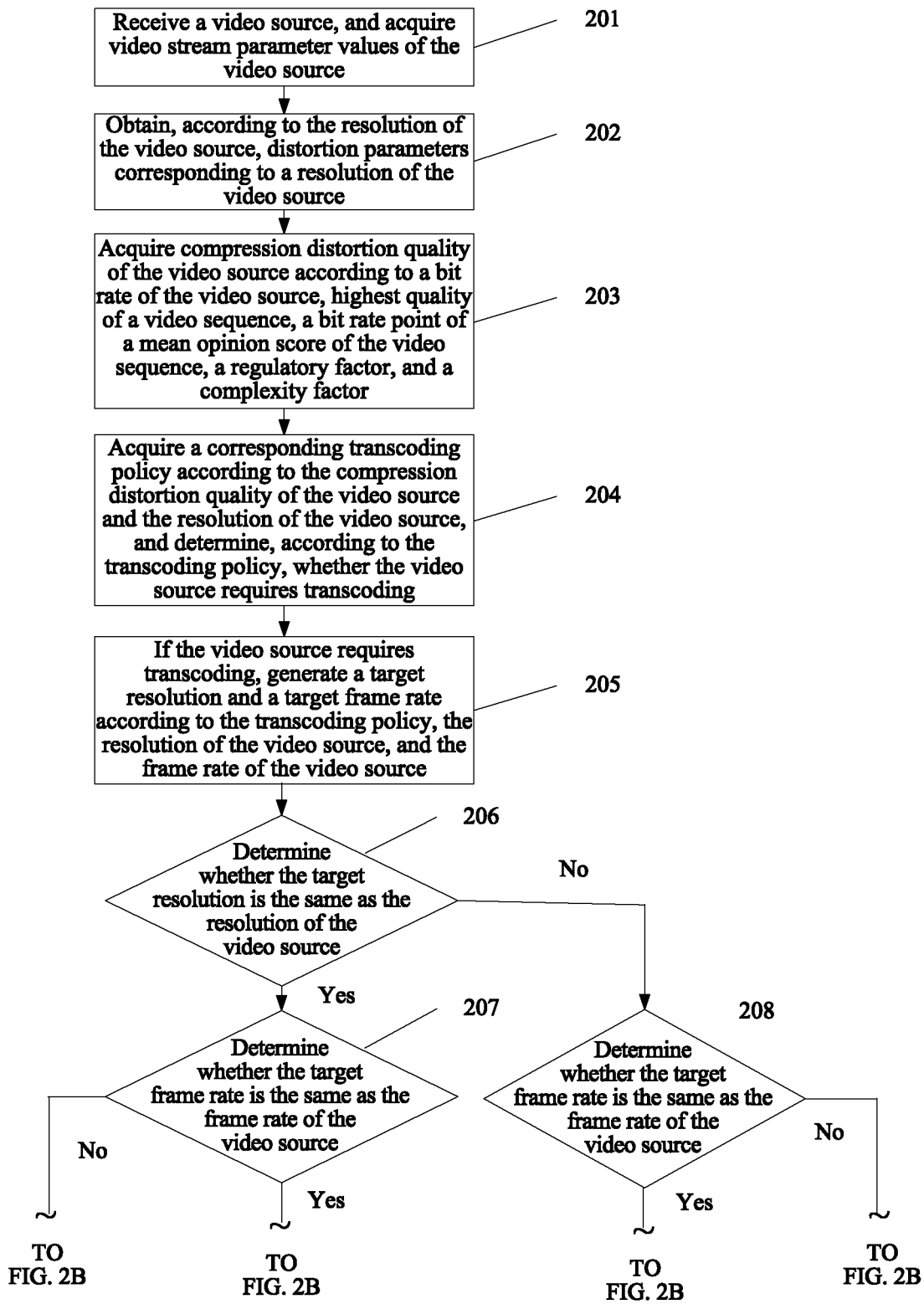
FIG. 2A and FIG. 2B is a flowchart of a video conversion method according to another embodiment of the present invention.
Figure 2B:
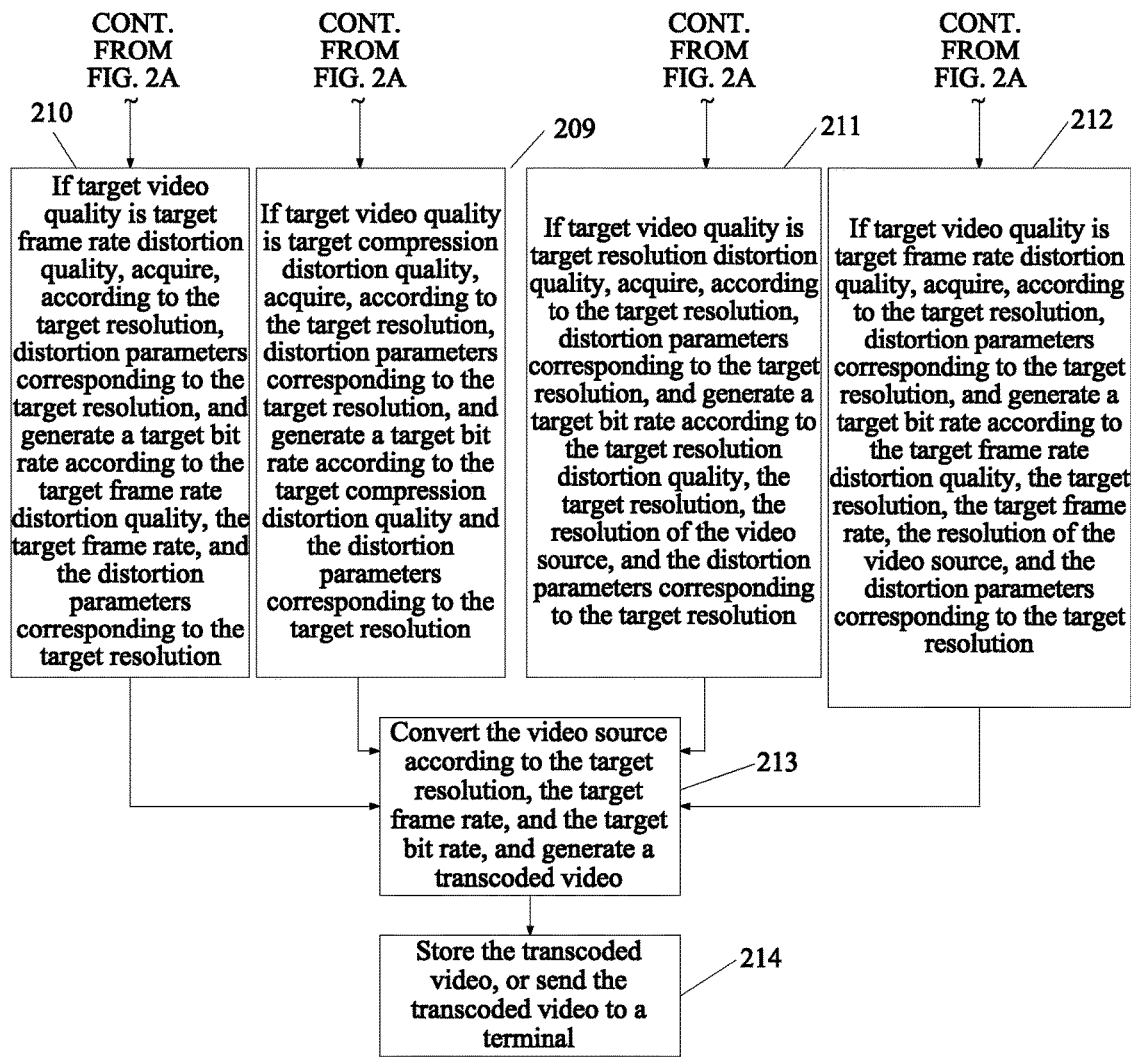

As shown in FIG. 2A and FIG. 2B, another embodiment of the present invention provides a video conversion method. In the method, a current network bandwidth is unknown. The method includes the following steps.

Step 201: Receive a video source, and acquire video code stream parameter values of the video source.

The video code stream parameter values include a bit rate of the video source, a resolution of the video source, and a frame rate of the video source.

Step 202: Obtain, according to the resolution of the video source, distortion parameters corresponding to the resolution of the video source.

The distortion parameters include the highest quality of a video sequence, a bit rate point of a mean opinion score of the video sequence, a regulatory factor, and a complexity factor.

Step 203: Acquire compression distortion quality of the video source according to the bit rate of the video source, the highest quality of the video sequence, the bit rate point of the mean opinion score of the video sequence, the regulatory factor, and the complexity factor.

Specifically, for the acquiring compression distortion quality of the video source, the compression distortion quality may be obtained by using a compression distortion model formula:

$$Quality_{encoding} = a - \left( \frac{a-1}{1 + \left(\frac{bitrate}{b}\right)^c} \right) + d,$$

but is not limited thereto. In the formula, $Quality_{encoding}$ is the compression distortion quality of the video source; a, b, c, and d are the distortion parameters corresponding to the resolution of the video source, where a is the highest quality of the video sequence, b is the bit rate point of the mean opinion score of the video sequence, c is the regulatory factor, and d is the complexity factor; and bitrate is the bit rate of the video source. Values of a, b, c, and d may be different for different resolutions of the video source, but are not limited thereto.

The complexity factor d may be generated according to the bit rate, a frame type, and a frame size of the video source. A value range of the complexity factor d is [−1, 1]. When a value is beyond the range, the value is equalized to a value within [−1, 1]. The complexity factor d can be obtained by using the following formula:

$$d = a1 * \frac{bitrate}{I\_size} + a2 + b1 * \frac{P\_size}{I\_size} + b2,$$

but is not limited thereto.

The variable bitrate is the bit rate of the video source. I_size is a size of an I frame in the video source, and may be a size of a certain I frame in the video source, or may also be an average value of sizes of any multiple I frames. P_size is a size of a P frame in the video source, and may be a size of a certain P frame in the video source, or may also be an average value of sizes of any multiple P frames. a1 is a space complexity factor, a2 is a space complexity adjustment factor, b1 is a time complexity factor, and b2 is a time complexity adjustment factor. Values of a1, a2, b1, and b2 may be different for different video sources or different resolutions of the video source, but are not limited thereto.

When the compression distortion quality of the video source is actually represented, the compression distortion quality may be represented by using a score. For example, if a five-grade marking system is used, a value range is [1, 5]. When a value is beyond the range, the value is equalized to a value within [1, 5]. For example, if a score obtained by calculation is 6 points, the value is 5 points.

Step 204: Acquire a corresponding transcoding policy according to the compression distortion quality of the video source and the resolution of the video source, and determine, according to the transcoding policy, whether the video source requires transcoding.

Optionally, in the acquiring a corresponding transcoding policy according to the compression distortion quality of the video source and the resolution of the video source, a resolution of a terminal with a relatively low resolution may be used as a minimum resolution, or a previous empirical value may be used as a minimum resolution. When a transcoding policy is being obtained, a corresponding transcoding policy is selected according to values of the resolution of the video source and the minimum resolution, but is not limited thereto.

Step 205: If the video source requires transcoding, generate a target resolution and a target frame rate according to the transcoding policy, the resolution of the video source, and the frame rate of the video source.

Specifically, the transcoding policy includes correspondence between the resolution of the video source and the target resolution and correspondence between the frame rate of the video source and the target frame source. A transcoding policy for the time when the resolution of the video source is less than the minimum terminal resolution is shown in Table 1. The policy is to perform regulation mainly by using a frame rate.

TABLE 1

TRANSCODING POLICY SOLUTION

| Compression distortion quality of the video source | Level | Transcoding policy for each level |
|---|---|---|
| Less than 3 points | 0 | No transcoding operation is performed. |
| Greater than or equal to 3 points, and less than or equal to 4 points | 1 | The frame rate and the resolution of the video source are used, and target video quality reaches 3 points. |
| | 2 | The resolution of the video source is used, the frame rate is reduced by half, and the target video quality reaches 3 points. |
| Greater than 4 points | 1 | The frame rate and the resolution of the video source are used, and the target video quality reaches 4 points. |
| | 2 | The frame rate and the resolution of the video source are used, and the target video quality reaches 3 points. |
| | 3 | The resolution of the video source is used, the frame rate is reduced by half, and the target video quality reaches 3 points. |

A transcoding policy for the time when the resolution of the video source is greater than or equal to the minimum terminal resolution is shown in Table 2. The policy is to perform regulation mainly by using a resolution.

TABLE 2

ANOTHER TRANSCODING POLICY SOLUTION

| Compression distortion quality of the video source | Level | Transcoding policy for each level |
|---|---|---|
| Less than 2 points | 0 | No transcoding operation is performed. |
| Greater than or equal to 2 points, and less than or equal to 3 points | 1 | The minimum terminal resolution is used, the frame rate is reduced by half, and the target video quality reaches 3 points. |
| Greater than or equal to 3 points, and less than or equal to 4 points | 1 | The resolution of the video source is reduced by half, the frame rate is unchanged, and the target video quality reaches 3.5 points. |
| | 2 | The minimum terminal resolution is used, the frame rate is reduced by half, and the target video quality reaches 3.5 points. |
| Greater than 4 points | 1 | The frame rate and the resolution of the video source are used, and the target video quality reaches 4 points. |

TABLE 2-continued

ANOTHER TRANSCODING POLICY SOLUTION

| Compression distortion quality of the video source | Level | Transcoding policy for each level |
|---|---|---|
| | 2 | The resolution of the video source is reduced by half, the frame rate is unchanged, and the target video quality reaches 3.5 points. |
| | 3 | The minimum terminal resolution is used, the frame rate is reduced by half, and the target video quality reaches 3.5 points. |

It should be noted that the transcoding policies in Table 1 and Table 2 are merely one specific example of this embodiment. Implementation of the transcoding policy in the present invention is not limited thereto.

Step 206: Determine whether the target resolution is the same as the resolution of the video source. If the target resolution is the same as the resolution of the video source, execute step 207; otherwise, execute step 208.

Step 207: Determine whether the target frame rate is the same as the frame rate of the video source. If the target frame rate is the same as the frame rate of the video source, execute step 209; otherwise, execute step 210.

Step 208: Determine whether the target frame rate is the same as the frame rate of the video source. If the target frame rate is the same as the frame rate of the video source, execute step 211; otherwise, execute step 212.

Step 209: If the target video quality is target compression distortion quality, acquire, according to the target resolution, distortion parameters corresponding to the target resolution, and generate a target bit rate according to the target compression distortion quality and the distortion parameters corresponding to the target resolution. Execute step 213.

Different distortion parameters may be acquired according to different target resolutions, but are not limited thereto.

Specifically, for the generating a target bit rate according to the target compression distortion quality and the distortion parameters, the target bit rate may be specifically obtained by using a compression distortion model formula:

$$Quality_{encoding} = a - \left(\frac{a-1}{1 + \left(\frac{bitrate}{b}\right)^c}\right) + d$$

that is:

$$bitrate = b * \left(\frac{a-1}{a+d - Quality_{encoding}}\right)^{\frac{1}{c}}$$

Step 210: If the target video quality is target frame rate distortion quality, acquire, according to the target resolution, distortion parameters corresponding to the target resolution, and generate a target bit rate according to the target frame rate distortion quality, the target frame rate, and the distortion parameters corresponding to the target resolution. Execute step 213.

Specifically, for the generating a target bit rate according to the target frame rate distortion quality, the target frame rate, and the distortion parameters, the target bit rate may be specifically obtained by using the following formulas:

compression distortion model formula:

$$Quality_{encoding} = a - \left(\frac{a-1}{1 + \left(\frac{bitrate}{b}\right)^c}\right) + d$$

resolution distortion model formula:

$$Quality_{resolution} = Quality_{encoding} * (p * scale + q)$$

frame rate distortion model formula:

$$Quality_{framerate} = Quality_{resolution} * \left(m * \ln\left(\frac{1000}{framerate}\right) + n\right)$$

Because the target resolution is the same as the resolution of the video source, the factors in the resolution distortion model formula have no impact on a value of a generated target bit rate, that is, the resolution distortion model formula:

$$Quality_{resolution} = Quality_{encoding} * (p * scale + q)$$

is represented as:

$$Quality_{resolution} = Quality_{encoding}$$

that is, when the resolution is unchanged, the resolution distortion quality is equal to the compression distortion quality; and the target bit rate is:

$$bitrate = b * \left(\frac{a-1}{a + d - \frac{Quality_{framerate}}{m * \ln\left(\frac{1000}{framerate}\right) + n}}\right)^{\frac{1}{c}}$$

Step 211: If the target video quality is target resolution distortion quality, acquire, according to the target resolution, distortion parameters corresponding to the target resolution, and generate a target bit rate according to the target resolution distortion quality, the target resolution, the resolution of the video source, and the distortion parameters corresponding to the target resolution. Execute step 213.

Specifically, for the generating a target bit rate according to the target resolution distortion quality, the target resolution, the resolution of the video source, and the distortion parameters corresponding to the target resolution, the target bit rate may be specifically obtained by using the following formulas:

compression distortion model formula:

$$Quality_{encoding} = a - \left(\frac{a-1}{1 + \left(\frac{bitrate}{b}\right)^c}\right) + d$$

resolution distortion model formula:

$$Quality_{resolution} = Quality_{encoding} * (p * scale + q)$$

In this case, because the target frame rate is equal to the frame rate of the video source, the frame rate distortion quality is equal to the resolution distortion quality; and the target bit rate is:

$$bitrate = b * \left( \frac{a-1}{a+d - \frac{Quality_{resolution}}{p*scale+q}} \right)^{\frac{1}{c}}$$

Step 212: If the target video quality is the target frame rate distortion quality, acquire, according to the target resolution, distortion parameters corresponding to the target resolution, and generate a target bit rate according to the target frame rate distortion quality, the target resolution, the target frame rate, the resolution of the video source, and the distortion parameters corresponding to the target resolution. Execute step 213.

Specifically, for the generating a target bit rate according to the target frame rate distortion quality, the target resolution, the target frame rate, the resolution of the video source, and the distortion parameters, the target bit rate may be specifically obtained by using the following formulas:

compression distortion model formula:

$$Quality_{encoding} = a - \left( \frac{a-1}{1 + \left(\frac{bitrate}{b}\right)^c} \right) + d$$

resolution distortion model formula:

$$Quality_{resolution} = Quality_{encoding} * (p*scale+q)$$

frame rate distortion model formula:

$$Quality_{framerate} = Quality_{resolution} * \left( m * \ln\left(\frac{1000}{framerate}\right) + n \right)$$

The target bit rate is:

$$bitrate = b * \left( \frac{a-1}{a+d - \frac{Quality_{framerate}}{m*\ln\left(\frac{1000}{framerate}\right)+n}} \right)^{\frac{1}{c}}$$

In the formulas in the foregoing steps 209-212, $Quality_{encoding}$ is the target compression distortion quality, $Quality_{resolution}$ is the target resolution distortion quality, and $Quality_{framerate}$ is the target frame rate distortion quality;

a, b, c, d, p, q, m, and n are the distortion parameters, where:

a is the highest quality of the video sequence;
b is the bit rate point of the mean opinion score of the video sequence;
c is the regulatory factor;
d is the complexity factor;
p is a resolution zoom factor;
q is a resolution zoom adjustment factor;
m is a frame rate attenuation factor; and
n is a frame rate attenuation adjustment factor;
bitrate is the target bit rate;
scale is the ratio of the target resolution to the resolution of the video source; and
framerate is the target frame rate.

The target compression distortion quality increases as the bit rate increases until the target compression distortion quality reaches a maximum value, and decreases as the complexity factor increases. The target resolution distortion quality decreases as the ratio of the target resolution to the resolution of the video source increases.

As a resolution increases, an influence of a frame rate on video quality increases, that is, as the resolution increases, the frame rate becomes smaller, the frame rate attenuation factor becomes greater, and frame rate distortion quality becomes poorer.

Step 213: Convert the video source according to the target resolution, the target frame rate, and the target bit rate, and generate a transcoded video.

A transcoding type that may be adopted in the conversion of the video source is real-time transcoding, offline transcoding, or multi-stream coding, but is not limited thereto.

Step 214: Store the transcoded video, or send the transcoded video to a terminal.

According to the video conversion method provided in the another embodiment of the present invention, a video source is received, and compression distortion quality of the video source is obtained. Further, a corresponding transcoding policy is acquired, and whether the video source requires transcoding is determined according to the transcoding policy. If the video source requires transcoding, transcoding parameters are generated according to the transcoding policy, and the video source is converted according to the transcoding parameters, so that target video quality is relatively high after the video source is converted, thereby improving user experience. Compared with the prior art, the video conversion method and apparatus provided in the embodiments of the present invention can solve a problem in the prior art that after video conversion, target video quality is low, and user experience is poor.

Figure 3A:
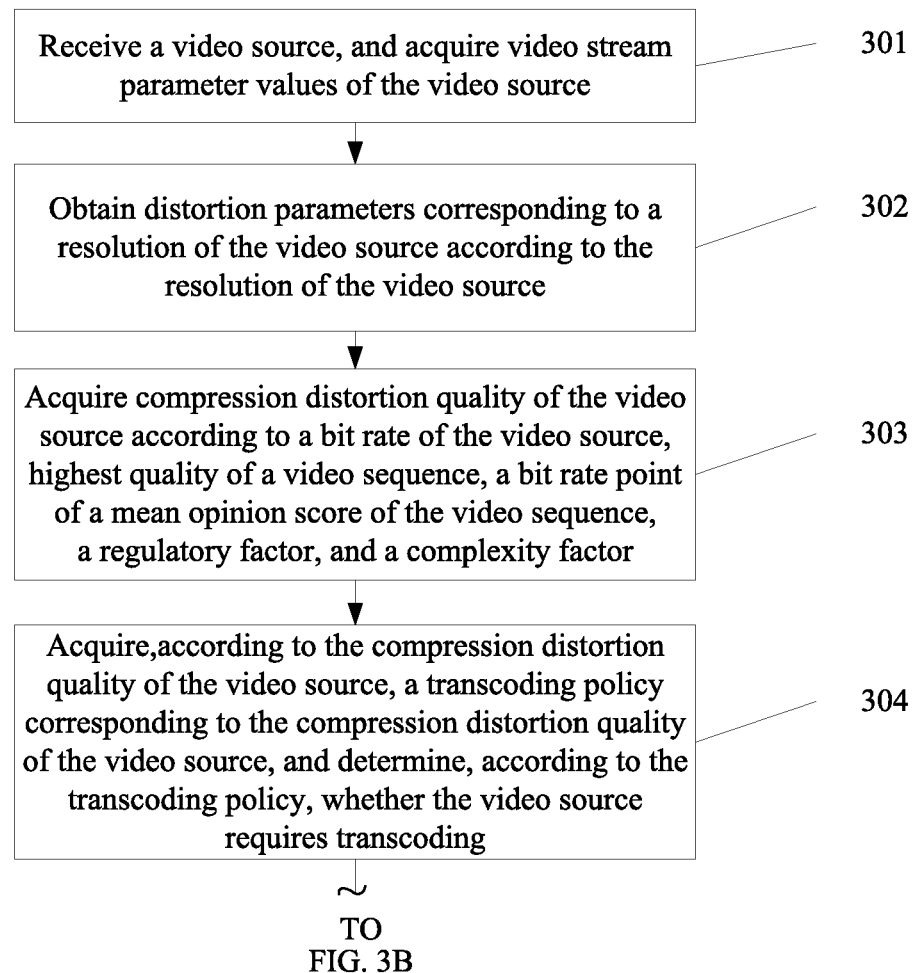
FIG. 3A and FIG. 3B is a flowchart of a video conversion method according to still another embodiment of the present invention.
Figure 3B:
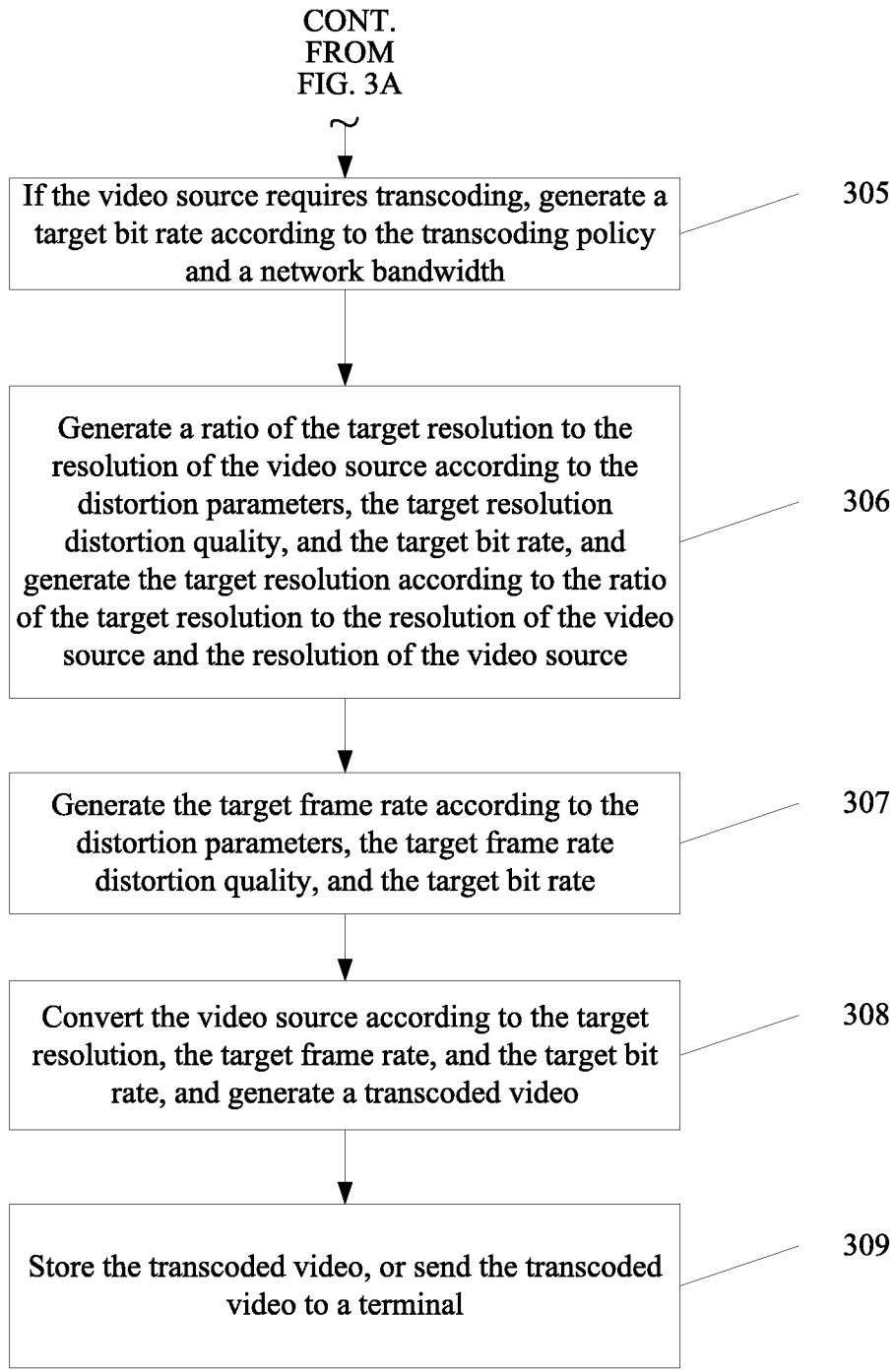

As shown in FIG. 3A and FIG. 3B, still another embodiment of the present invention provides a video conversion method. In the method, a current network bandwidth is known. The method includes:

Step 301: Receive a video source, and acquire video code stream parameter values of the video source.

The video code stream parameter values include a bit rate of the video source, a resolution of the video source, and a frame rate of the video source. For a specific implementation manner, reference is made to step 201 in FIG. 2A and FIG. 2B, and details are not repeatedly described herein.

Step 302: Obtain, according to the resolution of the video source, distortion parameters corresponding to the resolution of the video source.

The distortion parameters include the highest quality of a video sequence, a bit rate point of a mean opinion score of the video sequence, a regulatory factor, and a complexity factor. For a specific implementation manner, reference is made to step 202 in FIG. 2A and FIG. 2B, and details are not repeatedly described herein.

Step 303: Acquire compression distortion quality of the video source according to the bit rate of the video source, the highest quality of the video sequence, the bit rate point of the mean opinion score of the video sequence, the regulatory factor, and the complexity factor. For an implementation manner, reference is made to step 203 in FIG. 2A and FIG. 2B, and details are not repeatedly described herein.

Step 304: Acquire, according to the compression distortion quality of the video source, a transcoding policy corresponding to the compression distortion quality of the video source, and determine, according to the transcoding policy, whether the video source requires transcoding.

Step 305: If the video source requires transcoding, generate a target bit rate according to the transcoding policy and the network bandwidth.

The transcoding policy includes preset correspondence between the network bandwidth and the target bit rate.

The transcoding policy includes target video quality. The target video quality includes target compression distortion quality, target resolution distortion quality, and target frame rate distortion quality.

Specifically, when the target bit rate is set, the target bit rate is less than or equal to the network bandwidth.

For example, Table 3 shows another transcoding policy solution.

TABLE 3

ANOTHER TRANSCODING POLICY SOLUTION

| Compression distortion quality of the video source | Level | Transcoding policy for each level |
|---|---|---|
| Less than 3 points | 0 | No transcoding operation is performed. |
| Greater than or equal to 3 points, and less than or equal to 4 points | 1 | A bit rate that is the same as the network bandwidth value is used, and the target video quality reaches 3 points. |
|  | 2 | A bit rate that is ¾ of the network bandwidth value is used as the target bit rate, and the target video quality reaches 3 points. |
| Greater than 4 points | 1 | A bit rate that is ½ of the network bandwidth value is used as the target bit rate, and the target video quality reaches 4 points. |
|  | 2 | A bit rate that is ½ of the network bandwidth value is used as the target bit rate, and the target video quality reaches 3 points. |
|  | 3 | A bit rate that is ¼ of the network bandwidth value is used as the target bit rate, and the target video quality reaches 3 points. |

It should be noted that the transcoding policy in Table 3 is merely one specific example of this embodiment. Implementation of the transcoding policy in the present invention is not limited thereto.

Step 306: Generate a ratio of a target resolution to the resolution of the video source according to the distortion parameters, the target resolution distortion quality, and the target bit rate, and generate the target resolution according to the ratio of the target resolution to the resolution of the video source and the resolution of the video source.

For the generating a ratio of a target resolution to the resolution of the video source according to the distortion parameters, the target resolution distortion quality, and the target bit rate, the ratio may be specifically obtained by using the following formulas:

compression distortion model formula:

$$\text{Quality}_{encoding} = a - \left(\frac{a-1}{1+\left(\frac{bitrate}{b}\right)^c}\right) + d$$

resolution distortion model formula:

$$\text{Quality}_{resolution} = \text{Quality}_{encoding} * (p*\text{scale}+q)$$

The ratio of the target resolution to the resolution of the video source is:

$$\text{scale} = \frac{\dfrac{\text{Quality}_{resolution}}{a - \left(\dfrac{a-1}{1+\left(\frac{bitrate}{b}\right)^c}\right) + d} - q}{p}$$

Step 307: Generate a target frame rate according to the distortion parameters, the target frame rate distortion quality, and the target bit rate.

For the generating a target frame rate according to the distortion parameters, the target frame rate distortion quality, and the target bit rate, the target frame rate may be specifically obtained by using the following formulas:

compression distortion model formula:

$$\text{Quality}_{encoding} = a - \left(\frac{a-1}{1+\left(\frac{bitrate}{b}\right)^c}\right) + d$$

resolution distortion model formula:

$$\text{Quality}_{resolution} = \text{Quality}_{encoding} * (p*\text{scale}+q)$$

frame rate distortion model formula:

$$\text{Quality}_{framerate} = \text{Quality}_{resolution} * \left(m * \ln\left(\frac{1000}{framerate}\right) + n\right)$$

The target frame rate is:

$$framerate = \frac{1000}{\dfrac{\dfrac{\text{Quality}_{framerate}}{\left(\left(a - \left(\dfrac{a-1}{1+\left(\frac{bitrate}{b}\right)^c}\right) + d\right) * (p*\text{scale}+q)\right)} - n}{e^m}}$$

When the resolution is unchanged, the resolution distortion quality is equal to the compression distortion quality. When a frame rate is unchanged, the frame rate distortion quality is equal to the resolution distortion quality.

In the formulas in the foregoing steps 306-307, $\text{Quality}_{encoding}$ is the target compression distortion quality, $\text{Quality}_{resolution}$ is the target resolution distortion quality, and $\text{Quality}_{framerate}$ is the target frame rate distortion quality;

a, b, c, d, p, q, m, and n are the distortion parameters, where:

a is the highest quality of the video sequence;
b is the bit rate point of the mean opinion score of the video sequence;
c is the regulatory factor;
d is the complexity factor;
p is a resolution zoom factor;
q is a resolution zoom adjustment factor;
m is a frame rate attenuation factor; and
n is a frame rate attenuation adjustment factor;
bitrate is the target bit rate;

scale is the ratio of the target resolution to the resolution of the video source; and framerate is the target frame rate.

The target compression distortion quality increases as the bit rate increases until the target compression distortion quality reaches a maximum value, and decreases as the complexity factor increases. The target resolution distortion quality decreases as the ratio of the target resolution to the resolution of the video source increases.

As a resolution increases, an influence of a frame rate on video quality increases, that is, as the resolution increases, the frame rate becomes smaller, the frame rate attenuation factor becomes greater, and frame rate distortion quality becomes poorer.

Step 308: Convert the video source according to the target resolution, the target frame rate, and the target bit rate, and generate a transcoded video. For a specific implementation manner, reference is made to step 213 in FIG. 2A and FIG. 2B, and details are not repeatedly described herein.

A transcoding type that may be adopted in the conversion of the video source is real-time transcoding, offline transcoding, or multi-stream coding, but is not limited thereto.

Step 309: Store the transcoded video, or send the transcoded video to a terminal. For a specific implementation manner, reference is made to step 214 in FIG. 2A and FIG. 2B, and details are not repeatedly described herein.

According to the video conversion method provided in the still another embodiment of the present invention, a video source is received, and compression distortion quality of the video source is obtained. Further, a corresponding transcoding policy is acquired, and whether the video source requires transcoding is determined according to the transcoding policy. If the video source requires transcoding, transcoding parameters are generated according to the transcoding policy, and the video source is converted according to the transcoding parameters, so that target video quality is relatively high after the video source is converted, thereby improving user experience. Compared with the prior art, the video conversion method and apparatus provided in the embodiments of the present invention can solve a problem in the prior art that after video conversion, target video quality is low, and user experience is poor.

It should be noted that the formulas provided in the embodiments of the present invention may be in an additive form or a product form, or may also be in a form combining the additive form and the product form, but is not limited thereto.

It should be noted that calculation of the formulas provided in the embodiments of the present invention is performed in a video conversion apparatus, and the video conversion apparatus can be applied to a network device (for example, a network server) or a terminal device (for example, a mobile phone terminal, a tablet computer, and a notebook computer). If the network device or the terminal device has a relatively poor calculation capability and cannot meet a calculation requirement, correspondence between a calculation result and a known condition may be preset by using the formulas provided in the solution, and a required calculation result may be found according to the correspondence, but is not limited thereto.

Figure 4:
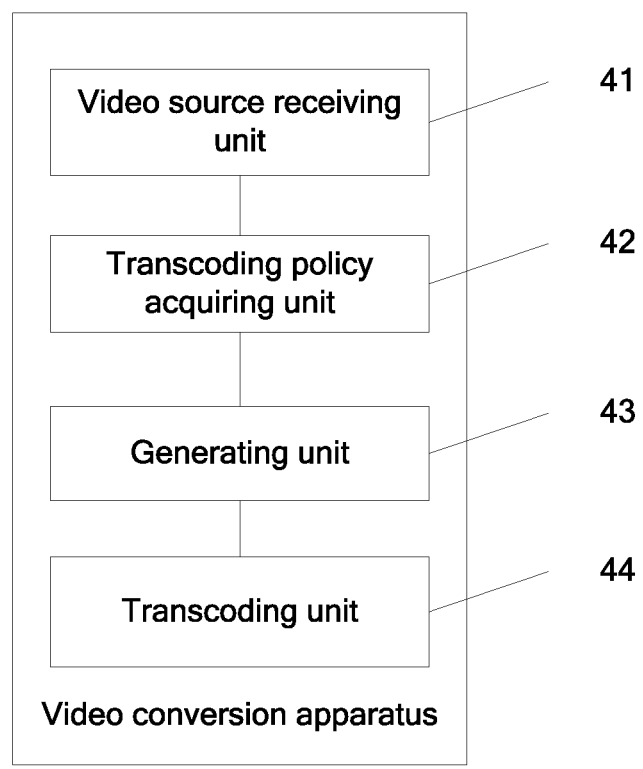
FIG. 4 is a first schematic structural diagram of a video conversion apparatus according to an embodiment of the present invention; and FIG. 5A

As shown in FIG. 4, an embodiment of the present invention provides a video conversion apparatus. A video source receiving unit 41 is configured to receive a video source and to acquire compression distortion quality of the video source. For a specific implementation manner, reference is made to step 101 in FIG. 1, and details are not repeatedly described herein. A transcoding policy acquiring unit 42 is configured to acquire, according to the compression distortion quality of the video source, a transcoding policy corresponding to the compression distortion quality of the video source, and to determine, according to the transcoding policy, whether the video source requires transcoding. For a specific implementation manner, reference is made to step 102 in FIG. 1, and details are not repeatedly described herein.

A generating unit 43 is configured to generate transcoding parameters according to the transcoding policy if the video source requires transcoding. The transcoding policy includes target video quality, and the transcoding parameters include a target resolution, a target frame rate, and a target bit rate. For a specific implementation manner, reference is made to step 103 in FIG. 1, and details are not repeatedly described herein. A transcoding unit 44 is configured to convert the video source according to the target resolution, the target frame rate, and the target bit rate, and generate a transcoded video. For a specific implementation manner, reference is made to step 104 in FIG. 1, and details are not repeatedly described herein.

It should be noted that the video conversion apparatus provided in the embodiment of the present invention can be applied to a network device (for example, a network server) or a terminal device (for example, a mobile phone terminal, a tablet computer, and a notebook computer), but is not limited thereto.

Figure 5A:
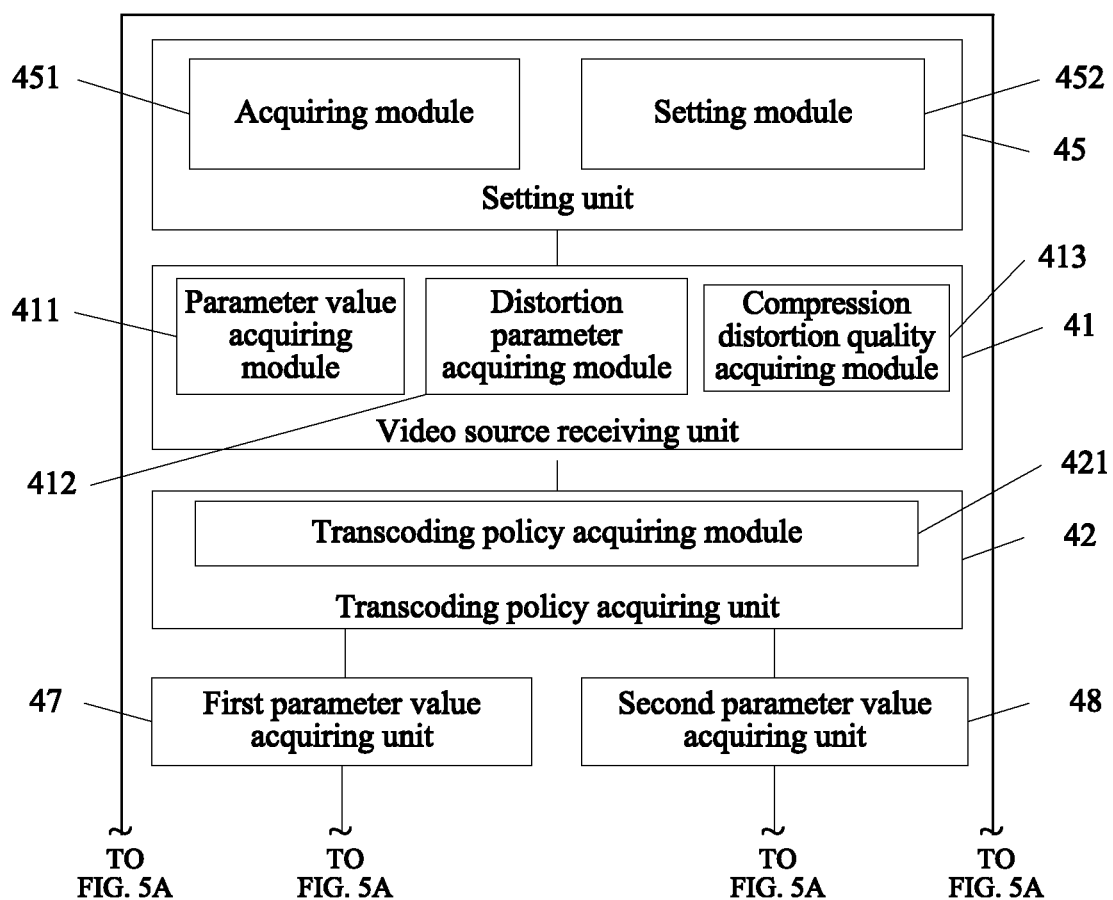
FIG. 5B is a second schematic structural diagram of a video conversion apparatus according to an embodiment of the present invention.
Figure 5B:
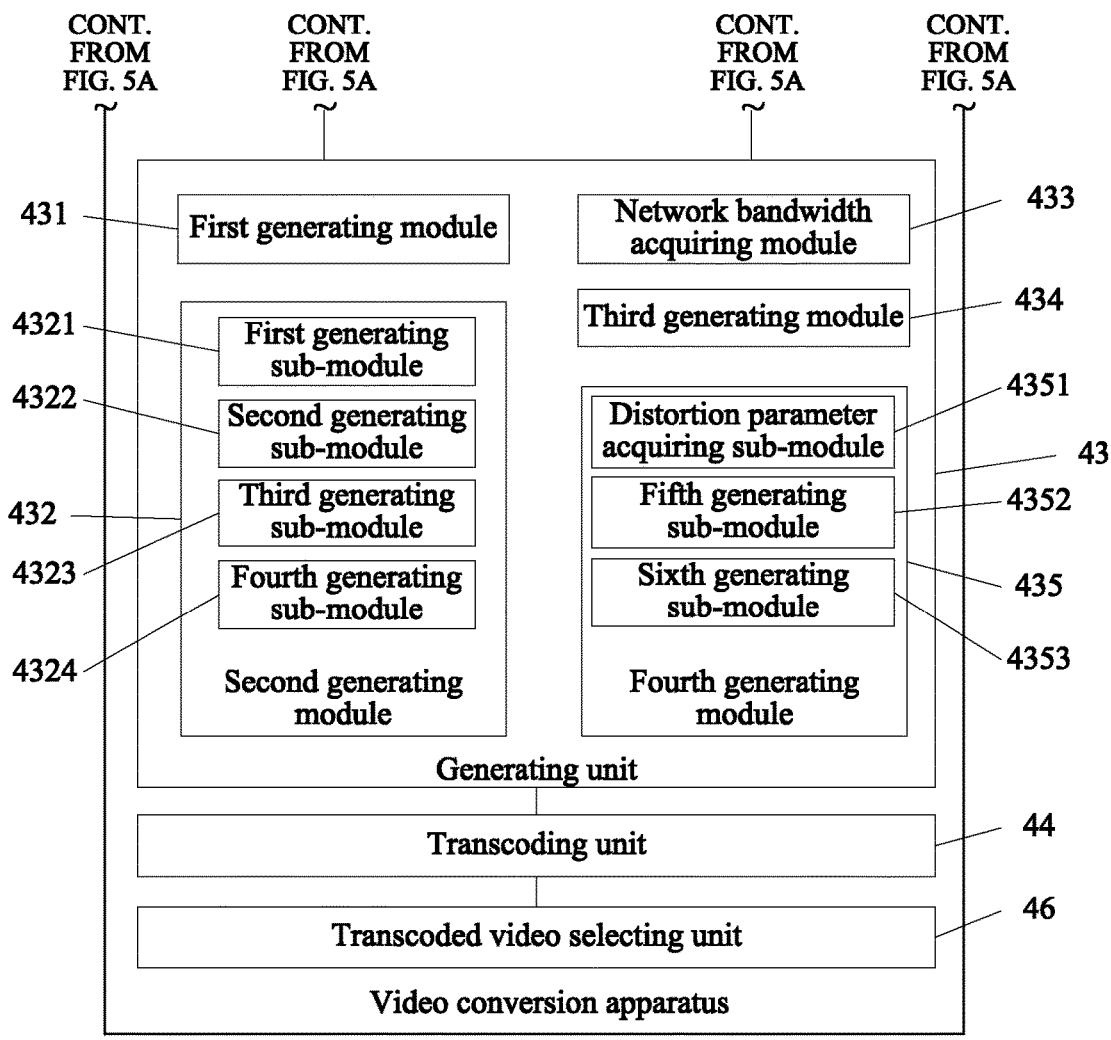

Further, as shown in FIG. 5A and FIG. 5B, before the steps implemented by the video source receiving unit 41. The apparatus further includes a setting unit 45, which is configured to set correspondence between the compression distortion quality and the transcoding policy. For a specific implementation manner, reference may be made to step 101 in FIG. 1 and details are not repeatedly described herein.

Further, as shown in FIG. 5A and FIG. 5B, the setting unit 45 includes an acquiring module 451, configured to acquire terminal information of multiple terminals. For a specific implementation manner, reference may be made to step 101 in FIG. 1, and details are not repeatedly described herein. A setting module 452 is configured to set the correspondence between the compression distortion quality and the transcoding policy according to terminal information of each terminal. For a specific implementation manner, reference may be made to step 101 in FIG. 1, and details are not repeatedly described herein.

Further, as shown in FIG. 5A and FIG. 5B, the video source receiving unit 41 includes a parameter value acquiring module 411, configured to acquire video code stream parameter values of the video source. W the video source, and for a specific implementation manner, reference is made to step 201 in FIG. 2A and FIG. 2B, and details are not repeatedly described herein.

A distortion parameter acquiring module 412 is configured to obtain, according to the resolution of the video source, distortion parameters corresponding to the resolution of the video source. The distortion parameters include the highest quality of a video sequence, a bit rate point of a mean opinion score of the video sequence, a regulatory factor, and a complexity factor. For a specific implementation manner, reference is made to step 202 in FIG. 2A and FIG. 2B, and details are not repeatedly described herein.

A compression distortion quality acquiring module 413 is configured to acquire the compression distortion quality of the video source according to the bit rate of the video source, the highest quality of the video sequence, the bit rate point of the mean opinion score of the video sequence, the regulatory factor, and the complexity factor. For a specific implementation manner, reference is made to step 203 in FIG. 2A and FIG. 2B, and details are not repeatedly described herein.

Further, as shown in FIG. 5A and FIG. 5B, if the compression distortion quality of the video source is corresponding to one or more levels of transcoding policies, the video source is converted into one or more transcoded videos corresponding to the one or more levels of transcoding policies. The apparatus further includes a transcoded video selecting unit 46, configured to acquire information of a terminal. The information of the terminal includes a resolution and a frame rate of the terminal. The unit 46 is also configured to acquire, according to the resolution and the frame rate of the terminal, a transcoded video corresponding to the resolution of the terminal. For a specific implementation manner, reference may be made to step 104 in FIG. 1, and details are not repeatedly described herein.

Further, as shown in FIG. 5A and FIG. 5B, when a network bandwidth is unknown, before the steps implemented by the generating unit 43. The apparatus further includes a first parameter value acquiring unit 47, configured to acquire the video code stream parameter values of the video source. The video code stream parameter values include the bit rate of the video source, the resolution of the video source, and the frame rate of the video source. For a specific implementation manner, reference may be made to step 201 in FIG. 2A and FIG. 2B, and details are not repeatedly described herein.

The generating unit 43 includes first and second generating module. A first generating module 431 is in FIG. 2, if the video source requires transcoding, generate the target resolution and the target frame rate according to the transcoding policy, the resolution of the video source, and the frame rate of the video source, where for a specific implementation manner, reference may be made to step 205 in FIG. 2A and FIG. 2B, and details are not repeatedly described herein. A second generating module 432 is configured to generate the target bit rate according to the target resolution, the target frame rate, and the target video quality, where for a specific implementation manner, reference may be made to steps 209-212 in FIG. 2A and FIG. 2B, and details are not repeatedly described herein.

Further, as shown in FIG. 5A and FIG. 5B, the transcoding policy acquiring unit 42 includes a transcoding policy acquiring module 421, configured to acquire a corresponding transcoding policy according to the compression distortion quality of the video source and the resolution of the video source, where for a specific implementation manner, reference may be made to step 204 in FIG. 2A and FIG. 2B, and details are not repeatedly described herein.

Further, as shown in FIG. 5A and FIG. 5B, the second generating module 432 includes a first generating sub-module 4321, configured to: if the target resolution is the same as the resolution of the video source, and the target frame rate is the same as the frame rate of the video source, determine that the target video quality is target compression distortion quality, acquire corresponding distortion parameters according to the target resolution, and generate the target bit rate according to the target compression distortion quality and the distortion parameters, where for a specific implementation manner, reference may be made to step 209 in FIG. 2A and FIG. 2B, and details are not repeatedly described herein.

A second generating sub-module 4322, configured to, if the target resolution is different from the resolution of the video source, and the target frame rate is the same as the frame rate of the video source, determine that the target video quality is target resolution distortion quality, acquire corresponding distortion parameters according to the target resolution, and generate the target bit rate according to the target resolution distortion quality, the target resolution, the resolution of the video source, and the distortion parameters, where for a specific implementation manner, reference may be made to step 211 in FIG. 2A and FIG. 2B, and details are not repeatedly described herein.

A third generating sub-module 4323, configured to: if the target resolution is the same as the resolution of the video source, and the target frame rate is different from the frame rate of the video source, determine that the target video quality is target frame rate distortion quality, acquire corresponding distortion parameters according to the target resolution, and generate the target bit rate according to the target frame rate distortion quality, the target frame rate, and the distortion parameters, where for a specific implementation manner, reference may be made to step 210 in FIG. 2A and FIG. 2B, and details are not repeatedly described herein.

A fourth generating sub-module 4324, configured to: if the target resolution is different from the resolution of the video source, and the target frame rate is different from the frame rate of the video source, determine that the target video quality is the target frame rate distortion quality, acquire corresponding distortion parameters according to the target resolution, and generate the target bit rate according to the target frame rate distortion quality, the target resolution, the target frame rate, the resolution of the video source, and the distortion parameters, where for a specific implementation manner, reference may be made to step 212 in FIG. 2A and FIG. 2B, and details are not repeatedly described herein.

Further, as shown in FIG. 5A and FIG. 5B, when a network bandwidth is known, the generating unit 43 includes a network bandwidth acquiring module 433, configured to acquire a current network bandwidth, where for a specific implementation manner, reference may be made to step 305 in FIG. 3A and FIG. 3B, and details are not repeatedly described herein. Is A third generating module 434, configured to generate the target bit rate according to the transcoding policy and the network bandwidth, where for a specific implementation manner, reference may be made to step 305 in FIG. 3A and FIG. 3B, and details are not repeatedly described herein. A fourth generating module 435, configured to generate the target resolution and the target frame rate according to the target video quality and the target bit rate, where for a specific implementation manner, reference may be made to steps 306-307 in FIG. 3A and FIG. 3B, and details are not repeatedly described herein.

Further, as shown in FIG. 5A and FIG. 5B, before the steps implemented by the generating unit 43, the apparatus further includes a second parameter value acquiring unit 48, configured to acquire the video code stream parameter values of the video source, where the video code stream parameter values include the bit rate of the video source, the resolution of the video source, and the frame rate of the video source, and for a specific implementation manner, reference may be made to step 301 in FIG. 3A and FIG. 3B, and details are not repeatedly described herein.

Further, as shown in FIG. 5A and FIG. 5B, the fourth generating module 435 includes a distortion parameter acquiring sub-module 4351, configured to acquire corresponding distortion parameters according to the resolution of the video source, where for a specific implementation manner, reference may be made to step 302 in FIG. 3A and FIG. 3B, and details are not repeatedly described herein.

A fifth generating sub-module 4352 is configured to generate a ratio of the target resolution to the resolution of the video source according to the distortion parameters, the target resolution distortion quality, and the target bit rate, and generate the target resolution according to the ratio of the target resolution to the resolution of the video source and the resolution of the video source, where for a specific implementation manner, reference may be made to step 306 in FIG. 3A and FIG. 3B, and details are not repeatedly described herein.

A sixth generating sub-module 4353 is configured to generate the target frame rate according to the distortion parameters, the target frame rate distortion quality, and the target bit rate, where for a specific implementation manner, reference may be made to step 307 in FIG. 3A and FIG. 3B, and details are not repeatedly described herein.

According to the video conversion apparatus provided in the embodiment of the present invention, a video source receiving unit receives a video source, and acquires compression distortion quality of the video source. Further, a transcoding policy acquiring unit acquires a corresponding transcoding policy, and determines, according to the transcoding policy, whether the video source requires transcoding. If the video source requires transcoding, a generating unit generates transcoding parameters according to the transcoding policy. A transcoding unit converts the video source according to the transcoding parameters, so that target video quality is relatively high after the video source is converted, thereby improving user experience. Compared with the prior art, the present invention can solve a problem in the prior art that after video conversion, target video quality is low, and user experience is poor.

According to the descriptions of the foregoing implementation manners, a person skilled in the art can clearly understand that the present invention may be implemented by using software and essential universal hardware, or certainly, may also be implemented by using hardware. However, in most cases, the former is a preferred implementation manner. Based on such an understanding, the technical solutions of the present invention essentially or the part contributing to the prior art may be implemented in a form of a software product. The software product is stored in a readable storage medium, such as a floppy disk, a hard disk or an optical disc of a computer, and includes several instructions for instructing a computer device (which may be a personal computer, a server, or a network device) to perform the methods described in the embodiments of the present invention.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A video conversion method, comprising:
    receiving a video source;
    obtaining compression distortion quality of the video source, wherein the compression distortion quality of the video source is based on one or more distortion parameters corresponding to a resolution of the video source, wherein receiving the video source and obtaining the compression distortion quality of the video source comprises:
        obtaining video code stream parameter values of the video source, wherein the video code stream parameter values comprise a bit rate of the video source, the resolution of the video source, and a frame rate of the video source;
        obtaining, according to the resolution of the video source, the distortion parameters corresponding to the resolution of the video source, wherein the distortion parameters further comprise a highest quality of a video sequence of the video source, a bit rate point of a mean opinion score of the video sequence, a regulatory factor, and a complexity factor; and
        obtaining the compression distortion quality of the video source according to the bit rate of the video source, the highest quality of the video sequence, the bit rate point of the mean opinion score of the video sequence, the regulatory factor, and the complexity factor;
    obtaining, according to the compression distortion quality of the video source, a transcoding policy corresponding to the compression distortion quality of the video source;
    determining, according to the transcoding policy, that the video source requires transcoding;
    generating transcoding parameters according to the transcoding policy, wherein the transcoding policy comprises target video quality and the transcoding parameters comprise a target resolution, a target frame rate, and a target bit rate;
    converting the video source according to the target resolution, the target frame rate, and the target bit rate; and
    generating a transcoded video.

2. The method according to claim 1, wherein, before receiving the video source and obtaining the compression distortion quality of the video source, the method further comprises setting correspondence between the compression distortion quality and the transcoding policy.

3. The method according to claim 2, wherein setting the correspondence between the compression distortion quality and the transcoding policy specifically comprises:
    obtaining terminal information of multiple terminals; and
    setting the correspondence between the compression distortion quality and the transcoding policy according to terminal information of each terminal.

4. The method according to claim 1, wherein for obtaining the compression distortion quality of the video source according to the bit rate of the video source, the highest quality of the video sequence, the bit rate point of the mean opinion score of the video sequence, the regulatory factor, and the complexity factor, the compression distortion quality of the video source is specifically obtained by using a compression distortion model formula:

$$\text{Quality}_{encoding} = a - \left( \frac{a-1}{1 + \left(\frac{bitrate}{b}\right)^c} \right) + d$$

wherein:
    $\text{Quality}_{encoding}$ is target compression distortion quality;
    a, b, c, and d are the distortion parameters corresponding to the resolution of the video source, wherein:
    a is the highest quality of the video sequence;
    b is the bit rate point of the mean opinion score of the video sequence;

c is the regulatory factor; and d is the complexity factor.

5. The method according to claim 1, wherein the compression distortion quality of the video source corresponds to one or more levels of transcoding policies and the video source is converted into one or more transcoded videos corresponding to the one or more levels of transcoding policies, the method further comprising:

obtaining information of a terminal, wherein the information of the terminal comprises a resolution and a frame rate of the terminal; and obtaining, according to the resolution and the frame rate of the terminal, a transcoded video corresponding to the resolution of the terminal.

6. The method according to claim 1, wherein a network bandwidth is unknown before generating transcoding parameters according to the transcoding policy if the video source requires transcoding;

wherein the method further comprises obtaining video code stream parameter values of the video source, wherein the video code stream parameter values comprise a bit rate of the video source, the resolution of the video source, and a frame rate of the video source; and wherein generating transcoding parameters according to the transcoding policy comprises:

generating the target resolution and the target frame rate according to the transcoding policy, the resolution of the video source, and the frame rate of the video source; and generating the target bit rate according to the target resolution, the target frame rate, and the target video quality.

7. The method according to claim 6, wherein obtaining, according to the compression distortion quality of the video source, the transcoding policy corresponding to the compression distortion quality of the video source comprises wiring a corresponding transcoding policy according to the compression distortion quality of the video source and the resolution of the video source.

8. The method according to claim 6, wherein generating the target bit rate according to the target resolution, the target frame rate, and the target video quality comprises:

if the target resolution is the same as the resolution of the video source and the target frame rate is the same as the frame rate of the video source, determining that the target video quality is target compression distortion quality, obtaining distortion parameters corresponding to the target resolution, and generating the target bit rate according to the target compression distortion quality and the distortion parameters corresponding to the target resolution;

if the target resolution is different from the resolution of the video source and the target frame rate is the same as the frame rate of the video source, determining that the target video quality is target resolution distortion quality, obtaining distortion parameters corresponding to the target resolution, and generating the target bit rate according to the target resolution distortion quality, the target resolution, the resolution of the video source, and the distortion parameters corresponding to the target resolution;

if the target resolution is the same as the resolution of the video source and the target frame rate is different from the frame rate of the video source, determining that the target video quality is target frame rate distortion quality, obtaining distortion parameters corresponding to the target resolution, and generating the target bit rate according to the target frame rate distortion quality, the target frame rate, and the distortion parameters corresponding to the target resolution; and if the target resolution is different from the resolution of the video source and the target frame rate is different from the frame rate of the video source, determining that the target video quality is target frame rate distortion quality, obtaining distortion parameters corresponding to the target resolution, and generating the target bit rate according to the target frame rate distortion quality, the target resolution, the target frame rate, the resolution of the video source, and the distortion parameters corresponding to the target resolution.

9. The method according to claim 8, wherein for triggering the target bit rate according to the target compression distortion quality and the distortion parameters corresponding to the target resolution, the target bit rate is specifically obtained by using a compression distortion model formula:

$$\text{Quality}_{encoding} = a - \left(\frac{a-1}{1+\left(\frac{bitrate}{b}\right)^c}\right) + d;$$

for generating the target bit rate according to the target resolution distortion quality, the target resolution, the resolution of the video source, and the distortion parameters corresponding to the target resolution, the target bit rate is specifically obtained by using the following formulas:

compression distortion model formula:

$$\text{Quality}_{encoding} = a - \left(\frac{a-1}{1+\left(\frac{bitrate}{b}\right)^c}\right) + d;$$

and resolution distortion model formula:

$$\text{Quality}_{resolution} = \text{Quality}_{encoding} * (p * \text{scale} + q);$$

for generating the target bit rate according to the target frame rate distortion quality, the target resolution, and the distortion parameters corresponding to the target resolution, the target bit rate is specifically obtained by using the following formulas:

compression distortion model formula:

$$\text{Quality}_{encoding} = a - \left(\frac{a-1}{1+\left(\frac{bitrate}{b}\right)^c}\right) + d;$$

resolution distortion model formula:

$$\text{Quality}_{resolution} = \text{Quality}_{encoding} * (p * \text{scale} + q); \text{ and}$$

frame rate distortion model formula:

$$\text{Quality}_{framerate} = \text{Quality}_{resolution} * \left(m * \ln\left(\frac{1000}{framerate}\right) + n\right);$$

for generating the target bit rate according to the target frame rate distortion quality, the target resolution, the target frame rate, the resolution of the video source, and the distortion parameters corresponding to the target resolution, the target bit rate is specifically obtained by using the following formulas:

compression distortion model formula:

$$\text{Quality}_{encoding} = a - \left(\frac{a-1}{1+\left(\frac{bitrate}{b}\right)^c}\right) + d;$$

resolution distortion model formula:

$$\text{Quality}_{resolution} = \text{Quality}_{encoding} * (p*scale+q); \text{ and}$$

frame rate distortion model formula:

$$\text{Quality}_{framerate} = \text{Quality}_{resolution} * \left(m*\ln\left(\frac{1000}{framerate}\right)+n\right)$$

wherein $\text{Quality}_{encoding}$ is the target compression distortion quality, $\text{Quality}_{resolution}$ is the target resolution distortion quality, and $\text{Quality}_{framerate}$ is the target frame rate distortion quality;

wherein a, b, c, d, p, q, m, and n are the distortion parameters and wherein:

a is the highest quality of the video sequence;
b is the bit rate point of the mean opinion score of the video sequence;
c is a regulatory factor;
d is a complexity factor;
p is a resolution zoom factor;
q is a resolution zoom adjustment factor;
m is a frame rate attenuation factor; and
n is a frame rate attenuation adjustment factor;
bitrate is the target bit rate;
scale is a ratio of the target resolution to the resolution of the video source; and
framerate is the target frame rate;
wherein the target compression distortion quality increases as the bit rate increases until the target compression distortion quality reaches a maximum value, and decreases as the complexity factor increases; and the target resolution distortion quality decreases as the ratio of the target resolution to the resolution of the video source increases; and
wherein, as a resolution increases, an influence of a frame rate on video quality increases, that is, as the resolution increases, the frame rate becomes smaller, the frame rate attenuation factor becomes greater, and frame rate distortion quality becomes poorer.

10. The method according to claim 1, wherein a network bandwidth is known and wherein generating transcoding parameters according to the transcoding policy if the video source requires transcoding comprises:
obtaining a current network bandwidth;
generating the target bit rate according to the transcoding policy and the network bandwidth; and
generating the target resolution and the target frame rate according to the target video quality and the target bit rate.

11. The method according to claim 10, wherein, before the generating transcoding parameters according to the transcoding policy if the video source requires transcoding, the method comprises obtaining video code stream parameter values of the video source, wherein the video code stream parameter values comprise a bit rate of the video source, the resolution of the video source, and a frame rate of the video source; and
wherein the target video quality comprises target compression distortion quality, target resolution distortion quality, and target frame rate distortion quality;
wherein generating the target resolution and the target frame rate according to the target video quality and the target bit rate specifically comprises:
obtaining corresponding distortion parameters according to the resolution of the video source;
generating a ratio of the target resolution to the resolution of the video source according to the distortion parameters, the target resolution distortion quality, and the target bit rate, and generating the target resolution according to the ratio of the target resolution to the resolution of the video source and the resolution of the video source; and
generating the target frame rate according to the distortion parameters, the target frame rate distortion quality, and the target bit rate.

12. The method according to claim 11, wherein for generating the ratio of the target resolution to the resolution of the video source according to the distortion parameters, the target resolution distortion quality, and the target bit rate, the ratio is obtained by using the following formulas:

compression distortion model formula:

$$\text{Quality}_{encoding} = a - \left(\frac{a-1}{1+\left(\frac{bitrate}{b}\right)^c}\right) + d;$$

and
resolution distortion model formula:

$$\text{Quality}_{resolution} = \text{Quality}_{encoding} * (p*scale+q);$$

for generating the target frame rate according to the distortion parameters, the target frame rate distortion quality, and the target bit rate, the target frame rate is obtained by using the following formulas:

compression distortion model formula:

$$\text{Quality}_{encoding} = a - \left(\frac{a-1}{1+\left(\frac{bitrate}{b}\right)^c}\right) + d;$$

resolution distortion model formula:

$$\text{Quality}_{resolution} = \text{Quality}_{encoding} * (p*scale+q); \text{ and}$$

frame rate distortion model formula:

$$\text{Quality}_{framerate} = \text{Quality}_{resolution} * \left(m*\ln\left(\frac{1000}{framerate}\right)+n\right)$$

wherein $\text{Quality}_{encoding}$ is the target compression distortion quality, $\text{Quality}_{resolution}$ is the target resolution distortion quality, and $\text{Quality}_{framerate}$ is the target frame rate distortion quality;

a, b, c, d, p, q, m, and n are the distortion parameters, wherein:
a is the highest quality of the video sequence;
b is the bit rate point of the mean opinion score of the video sequence;

c is a regulatory factor;
d is a complexity factor;
p is a resolution zoom factor;
q is a resolution zoom adjustment factor;
m is a frame rate attenuation factor; and
n is a frame rate attenuation adjustment factor;
bitrate is the target bit rate;
scale is the ratio of the target resolution to the resolution of the video source; and
framerate is the target frame rate;
wherein the target compression distortion quality increases as the bit rate increases until the target compression distortion quality reaches a maximum value, and decreases as the complexity factor increases, and the target resolution distortion quality decreases as the ratio of the target resolution to the resolution of the video source increases; and
wherein, as a resolution increases, an influence of a frame rate on video quality increases, that is, as the resolution increases, the frame rate becomes smaller, the frame rate attenuation factor becomes greater, and frame rate distortion quality becomes poorer.

13. The method according to claim 1, wherein the transcoding is real-time transcoding, offline transcoding, or multi-stream coding.

14. A video conversion apparatus, comprising:
at least one hardware processor;
a non-transitory computer-readable storage medium coupled to the at least one hardware processor and storing programming instructions for execution by the at least one hardware processor, wherein the programming instructions instruct the at least one hardware processor to:
receive a video source and to acquire compression distortion quality of the video source, wherein the compression distortion quality of the video source is based on one or more distortion parameters corresponding to a resolution of the video source, wherein the programming instructions instruct the at least one hardware processor to:
  obtain video code stream parameter values of the video source, wherein the video code stream parameter values comprise a bit rate of the video source, the resolution of the video source, and a frame rate of the video source;
  obtain, according to the resolution of the video source, the distortion parameters corresponding to the resolution of the video source, wherein the distortion parameters further comprise a highest quality of a video sequence of the video source, a bit rate point of a mean opinion score of the video sequence, a regulatory factor, and a complexity factor; and
  obtain the compression distortion quality of the video source according to the bit rate of the video source, the highest quality of the video sequence, the bit rate point of the mean opinion score of the video sequence, the regulatory factor, and the complexity factor;
obtain, according to the compression distortion quality of the video source, a transcoding policy corresponding to the compression distortion quality of the video source, and to determine, according to the transcoding policy, whether the video source requires transcoding;
generate transcoding parameters according to the transcoding policy if the video source requires transcoding, wherein the transcoding policy comprises target video quality, and the transcoding parameters comprise a target resolution, a target frame rate, and a target bit rate; and
convert the video source according to the target resolution, the target frame rate, and the target bit rate, and to generate a transcoded video.

15. The apparatus according to claim 14, wherein the programming instructions instruct the at least one hardware processor to set correspondence between the compression distortion quality and the transcoding policy before receiving the video source and to acquire compression distortion quality of the video source.

16. The apparatus according to claim 15, wherein the programming instructions instruct the at least one hardware processor to:
obtain terminal information of multiple terminals; and
set the correspondence between the compression distortion quality and the transcoding policy according to terminal information of each terminal.

17. The apparatus according to claim 14, wherein, if the compression distortion quality of the video source is corresponding to one or more levels of transcoding policies, the video source is converted into one or more transcoded videos corresponding to the one or more levels of transcoding policies, and wherein the programming instructions instruct the at least one hardware processor to:
obtain information of a terminal, wherein the information of the terminal comprises a resolution and a frame rate of the terminal, and acquire, according to the resolution and the frame rate of the terminal, a transcoded video corresponding to the resolution of the terminal.

18. The apparatus according to claim 14, wherein the programming instructions instruct the at least one hardware processor to:
obtain video code stream parameter values of the video source, wherein the video code stream parameter values comprise a bit rate of the video source, the resolution of the video source, and a frame rate of the video source;
if the video source requires transcoding, generate the target resolution and the target frame rate according to the transcoding policy, the resolution of the video source, and the frame rate of the video source; and
generate the target bit rate according to the target resolution, the target frame rate, and the target video quality.

19. The apparatus according to claim 18, wherein the programming instructions instruct the at least one hardware processor to obtain a corresponding transcoding policy according to the compression distortion quality of the video source and the resolution of the video source.

20. The apparatus according to claim 18, wherein the programming instructions instruct the at least one hardware processor to:
if the target resolution is the same as the resolution of the video source, and the target frame rate is the same as the frame rate of the video source, determine that the target video quality is target compression distortion quality, acquire corresponding distortion parameters according to the target resolution, and generate the target bit rate according to the target compression distortion quality and the distortion parameters;
if the target resolution is different from the resolution of the video source, and the target frame rate is the same as the frame rate of the video source, determine that the target video quality is target resolution distortion quality, acquire corresponding distortion parameters according to the target resolution, and generate the target bit rate according to the target resolution distortion quality, the target resolution, the resolution of the video source, and the distortion parameters;

if the target resolution is the same as the resolution of the video source, and the target frame rate is different from the frame rate of the video source, determine that the target video quality is target frame rate distortion quality, acquire corresponding distortion parameters according to the target resolution, and generate the target bit rate according to the target frame rate distortion quality, the target frame rate, and the distortion parameters; and if the target resolution is different from the resolution of the video source, and the target frame rate is different from the frame rate of the video source, determine that the target video quality is target frame rate distortion quality, acquire corresponding distortion parameters according to the target resolution, and generate the target bit rate according to the target frame rate distortion quality, the target resolution, the target frame rate, and the distortion parameters.

21. The apparatus according to claim 14, wherein the programming instructions instruct the at least one hardware processor to:

obtain a current network bandwidth;

generate the target bit rate according to the transcoding policy and the network bandwidth; and generate the target resolution and the target frame rate according to the target video quality and the target bit rate.

22. The apparatus according to claim 21, wherein the programming instructions instruct the at least one hardware processor to:

obtain video code stream parameter values of the video source, wherein the video code stream parameter values comprise a bit rate of the video source, the resolution of the video source, and a frame rate of the video source;

obtain corresponding distortion parameters according to the resolution of the video source;

generate a ratio of the target resolution to the resolution of the video source according to the distortion parameters, target resolution distortion quality, and the target bit rate, and to generate the target resolution according to the ratio of the target resolution to the resolution of the video source and the resolution of the video source; and generate the target frame rate according to the distortion parameters, target frame rate distortion quality, and the target bit rate.

* * * * *

UNITED STATES PATENT AND TRADEMARK OFFICE
CERTIFICATE OF CORRECTION

PATENT NO. : 9,872,021 B2
APPLICATION NO. : 14/335119
DATED : January 16, 2018
INVENTOR(S) : Jiali Fu and Qingpeng Xie It is certified that error appears in the above-identified patent and that said Letters Patent is hereby corrected as shown below:

In the Claims

In Column 22, In Line 37, In Claim 12, delete "$Quality_{resolution}n$" and insert -- $Quality_{resolution}$ --, therefor.

Signed and Sealed this
Twenty-sixth Day of June, 2018

Andrei Iancu
*Director of the United States Patent and Trademark Office*